Patented Feb. 16, 1943

2,311,189

UNITED STATES PATENT OFFICE 2,311,189

PURIFICATION OF BENZENE

Merlin D. Peterson, Wilmington, Del., assignor to E. I. du Pont de Nemours & Company, Wilmington, Del., a corporation of Delaware No Drawing. Application December 23, 1939, Serial No. 310,758

3 Claims. (Cl. 260—674)

This invention relates to sulfur-removal from benzene and more particularly to a continuous process for the removal of sulfur-containing compounds from benzene.

As usually commercially obtained, benzene has a content of sulfur in the form of sulfur compounds which may have no particularly bad effects upon a number of uses for which benzene is employed. Such uses include its employment as a solvent, as a fuel, and the like. When, however, benzene is to be used as a reactant in chemical processes, it frequently is desirable that its sulfur content be greatly if not completely reduced, such for example as in processes using equipment or catalysts which are sensitive to and adversely affected by sulfur.

Accordingly, attempts have been made to furnish and proposals have previously been suggested for processes of benzene purification or sulfur removal involving a number of different methods such as oxidation, halogenation, hydrogenation, sulfonation, and the like.

None of the previously proposed processes have been widely or successfully used, however, because of the high cost of operation, incomplete purification, corrosiveness of reactants employed, or non-adaptability of such proposals to large scale, commercial practice.

It is an object of this invention to overcome these and other disadvantages of the prior art and to provide a new and improved process for the substantial if not complete removal of sulfur from benzene.

It is a further object of this invention to provide a continuous process for purification of benzene which is adaptable to large scale commercial practice.

Other objects and advantages of this invention will be apparent from the following specification.

According to this invention, benzene containing sulfur as such and in the form of sulfur compounds such specifically as thiophene and carbon bisulfide is purified by a continuous process comprising: admixture of the benzene with anhydrous aluminum chloride; distillation of the resulting mixture followed by admixture of the resulting distillate with an alcoholic alkali solution such as potassium or sodium hydroxide in methanol, ethanol, butanol or similar alcohols; and washing of the resultant solution with water to give a benzene substantially if not completely free of sulfur, having a sulfur content of less than 2 parts per million.

According to preferred operation of this invention, crude benzene containing sulfur is mixed with sufficient anhydrous aluminum chloride to saturate the benzene and continuously pumped into the lower part, the pot, of a steel vessel having the characteristics of a continuous atmospheric still. The resultant mixture is heated and maintained at a temperature at which benzene distils. The hot benzene distillate, purified of its thiophene content by reaction with the aluminum chloride, is continuously conducted to a second vessel, in the form of a mixing tank, wherein the benzene is intimately mixed, preferably by agitation, with an alcoholic alkali solution such as potassium hydroxide in ethanol or sodium hydroxide in methanol. The resultant alcoholic alkali-benzene solution is passed into the bottom of a third vessel which is preferably in the form of a baffled tower. After passage from the bottom up the length of the baffled tower, the thoroughly mixed benzene-alcoholic alkali solution is cooled and passed, preferably, to the lower part of a fourth vessel, a water-extraction vessel wherein, as it rises toward the top of the vessel, it comes in contact with and is washed by water which is simultaneously introduced toward the top of the extraction vessel. This fourth vessel is, preferably, baffled to insure intimate mixture with water of the benzene alcoholic alkali solution in the counter-current flow of this solution in contact with water. This intimate mixture of the up-flowing benzene-containing solution and down-flowing water in the water-extraction vessel effects solution in the water of the water-soluble carbon bisulfide reaction product, alkali alkyl xanthate, which has been formed by reaction of the alcoholic solution of alkali with the carbon bisulfide content of the benzene. In addition, the intimate admixture of these solutions effects solution in the water of the alkali chloride, soluble sulfur compounds and the excess unreacted alkali and alcohol. The resultant impurity-containing water is then continuously conducted from an outlet at the bottom of the extraction vessel while water-saturated and substantially sulfur-free benzene is removed from the top. Inasmuch as the mutual solubility of water and benzene is extremely small (0.082 gram per 100 cc. at 22° C.) the resultant pure benzene, containing very slight amounts of water, may be used for many chemical reactions requiring substantially pure benzene. If desired, however, it may readily be treated by known methods for removal of its small water content.

Dependent upon the quantities of benzene processed, and thus in turn dependent upon the quantities of methanol utilized in the carbon bisulfide removal step, it may be desired to recover the excess unreacted methanol content of the water from the last benzene water-extraction step. If the volume of unreacted methanol in this step is sufficiently large to warrant its recovery, the water from the benzene extraction step may be conducted to a still for distillation therefrom of the methanol followed by recirculation thereof, together with make-up sodium hydroxide, to the carbon bisulfide-removal step.

In commencing operation, although the ratio of aluminum chloride to benzene may vary greatly (depending upon the amount of sulfur and sulfur compounds present in the benzene), it is preferred to use at least 1.2% aluminum chloride, based upon the weight of the benzene, in order to saturate the benzene at 80° C. Thereafter, addition of 0.26% aluminum chloride is adequate to make up for that portion of chloride actually reacting with the sulfur. The amount of aluminum chloride utilized also varies somewhat in proportion to the amount of water contained in the benzene being purified. Thus, for every 0.01% more (or less) then 0.028% water in the raw benzene to be purified, the amount of aluminum chloride admixed with the benzene should be increased (or decreased) by about 0.05% of the benzene charged.

As previously indicated, the benzene-aluminum chloride mixture is preferably heated to a temperature of approximately 80–100° C. after it has been placed in the thiophene-removal still. At this temperature, which may be varied within the range of 80 to 130° C. without adverse effect upon the reaction products, the benzene distils over at a rapid rate and may be removed from the condensing coils and passed directly to the tank in which it is mixed with, preferably, sodium hydroxide-methanol solution. The amount and concentration of alcoholic alkali solution may vary over a wide range. Thus, although it is preferred to use 2% by volume (based on the benzene) of a 1 N sodium hydroxide solution in methanol, the concentration of alkali may be increased as desired and the amount of solution may likewise be raised to 10% by volume and higher.

The mixing tank is maintained at a temperature within the range of 25 to 80° C., preferably about 80° C. After undergoing mixing and reaction with the sodium hydroxide-methanol solution, the benzene containing the xanthate, unreacted methanol and unreacted sodium hydroxide is cooled to about 35° C. and thereafter passed to the water extraction step. The amount of water, in comparison with the benzene fed into the bottom of the water extraction vessel, is approximately 10% by weight based upon the weight of the benzene treated. Although this is the preferred percentage of water utilized for washing, the quantities of water employed may vary over a wide range such, for example, as from 10 to 30% or more.

The following example illustrates how this invention may be practiced.

*Example I*

During an hour, into a closed mild steel reaction vessel having the characteristics of a continuous atmospheric still there is passed 2271.22 pounds of crude benzene containing 2270 pounds of benzene, 0.63 pound of water, 0.27 pound of thiophene, and 0.32 pound of carbon bisulfide. This crude benzene is mixed with 35.4 pounds of a slurry of aluminum chloride and benzene containing 29.5 pounds of benzene and 5.9 pounds of aluminum chloride. The resulting mixture is then heated to a temperature of 80° and, over a period of an hour, a distillate is removed comprising 2260.32 pounds of crude benzene containing 0.32 pound of carbon bisulfide. This distillate is then continuously passed to the top of a second vessel which is in the form of a baffled tower. Simultaneously therewith there is introduced into this second vessel 43.3 pounds of a solution of sodium hydroxide-methanol, containing 40.8 pounds of methanol and 2.5 pounds of sodium hydroxide, so that for every 2260.32 pounds of crude benzene there will be introduced into the mixing vessel 43.3 pounds of sodium hydroxide dissolved in methanol.

The benzene and sodium hydroxide-methanol solution are introduced toward the bottom of a second vessel and after passage from the bottom up the length of the baffled tower, the thoroughly mixed benzene-sodium hydroxide-methanol solution is cooled and passed, preferably, to the lower part of a water extraction vessel, wherein 2303 pounds of benzene-sodium hydroxide-methanol mixture comes in counter-current contact with 735 pounds of water which is introduced toward the top of the water extraction vessel. This water extraction vessel is baffled, preferably, to insure intimate contact of the water with the benzene-sodium hydroxide-methanol solution in the counter-current flow of this solution in contact with the water.

Due to the intimate mixture of the water with the benzene solution the water soluble carbon bisulfide reaction product, sodium methyl xanthate, which is formed by reaction of the methanol solution of sodium hydroxide with the carbon bisulfide content of the benzene, is removed from the benzene solution and remains in the water layer which passes to the bottom part of the vessel. Inasmuch as the benzene has a lower specific gravity than water, the purified benzene progresses toward the top of the vessel and from the top of the vessel, over a period of an hour, there is removed 2260 pounds of benzene containing, in addition, 1.8 pounds of water. The carbon bisulfide content of this purified benzene is less than 0.002 pound and the thiophene content is less than 0.002 pound.

The methanol may be recovered from the water layer by known methods such as acidulation followed by distillation.

Various changes may be made in the details and preferred embodiments of this invention without departing therefrom or sacrificing the advantages thereof.

I claim:

1. In a process for the removal of thiophene from benzene containing it the steps which comprise introducing thiophene-containing benzene and anhydrous aluminum chloride into a mixture of aluminum chloride saturated benzene maintained at the boiling point of the mixture and distilling off the thiophene-free benzene.

2. In a process for the removal of thiophene from benzene containing it the steps which comprise introducing anhydrous aluminum chloride and thiophene-containing benzene, into aluminum chloride saturated benzene maintained at a temperature of approximately 80° C. and distilling off the thiophene-free benzene.

3. In a process for the removal of thiophene from crude benzene containing it the steps which comprise introducing, the crude benzene, 0.26% aluminum chloride based on the crude benzene together with 0.05% by weight of aluminum chloride per each 0.01% more than 0.028% water in the benzene, into aluminum chloride saturated benzene, at a temperature of approximately 80° C., and distilling off the thiophene-free benzene.

MERLIN D. PETERSON.